United States Patent [19]

Gibbons

[11] Patent Number: 5,525,794

[45] Date of Patent: Jun. 11, 1996

[54] ELECTRONIC GAIN CONTROL FOR PHOTOMULTIPLIER USED IN GAMMA CAMERA

[75] Inventor: John C. Gibbons, Macedonia, Ohio

[73] Assignee: Summit World Trade Corp., Hudson, Ohio

[21] Appl. No.: 521,893

[22] Filed: Aug. 31, 1995

Related U.S. Application Data

[63] Continuation of Ser. No. 247,063, May 20, 1994, Pat. No. 5,453,610.

[51] Int. Cl.$^6$ .............................. G01T 1/208; H01J 40/14
[52] U.S. Cl. .............................. 250/207; 250/214 AG; 250/363.09; 313/535; 315/383
[58] Field of Search .............................. 250/207, 214 VT, 250/214 AG, 214 LA, 363.02, 363.09; 313/105 R, 400, 535, 536; 315/383

[56] References Cited

U.S. PATENT DOCUMENTS

| | | |
|---|---|---|
| 3,714,441 | 1/1973 | Kreda . |
| 4,091,287 | 5/1978 | Hounsfield . |
| 4,582,995 | 4/1986 | Lim et al. . |
| 4,590,368 | 5/1986 | Govaert ................... 250/207 |
| 4,804,891 | 2/1989 | Sweeney ................... 250/207 |
| 4,808,826 | 2/1989 | Lim et al. . |
| 4,820,914 | 4/1989 | Allen ....................... 250/207 |
| 4,866,615 | 9/1989 | Ichihara . |
| 4,893,015 | 1/1990 | Kubierschky et al. . |
| 5,004,904 | 4/1991 | Yamakawa et al. ........ 250/207 |
| 5,118,948 | 6/1992 | Ito et al. . |
| 5,453,610 | 9/1995 | Gibbons ................... 250/207 |

FOREIGN PATENT DOCUMENTS

| | | |
|---|---|---|
| 0066763 | 12/1982 | European Pat. Off. . |
| 0155377 | 9/1985 | European Pat. Off. . |
| 1222536 | 7/1981 | France . |
| 851548 | 6/1960 | Russian Federation . |

*Primary Examiner*—Edward P. Westin
*Assistant Examiner*—John R. Lee
*Attorney, Agent, or Firm*—Frank J. Nawalanic

[57] ABSTRACT

An electronic gain control is disclosed for the photomultipliers of a gamma camera which assures that all photomultipliers in the camera have uniform gain for any given gamma event. A specific dynode in the photomultiplier is isolated from the line resistive voltage divider string in the photomultiplier which places each dynode under incremental voltages. A voltage is then applied to the isolated dynode which can vary anywhere from the voltage the isolated dynode would have had if inserted in the voltage divider string to the voltage that the immediately preceding or immediately succeeding dynode in the string has whereby the photomultiplier's gain is controlled. The applied voltage to the isolated dynode is developed electronically by a voltage to frequency converter coupled by an opto-isolator to a gain voltage divider circuit which cycles the applied voltage between two different voltage potentials tapped from the voltage divider string. The voltage to frequency converter is controlled by individual gain signals developed and stored during calibration of the camera for each photomultiplier.

1 Claim, 7 Drawing Sheets

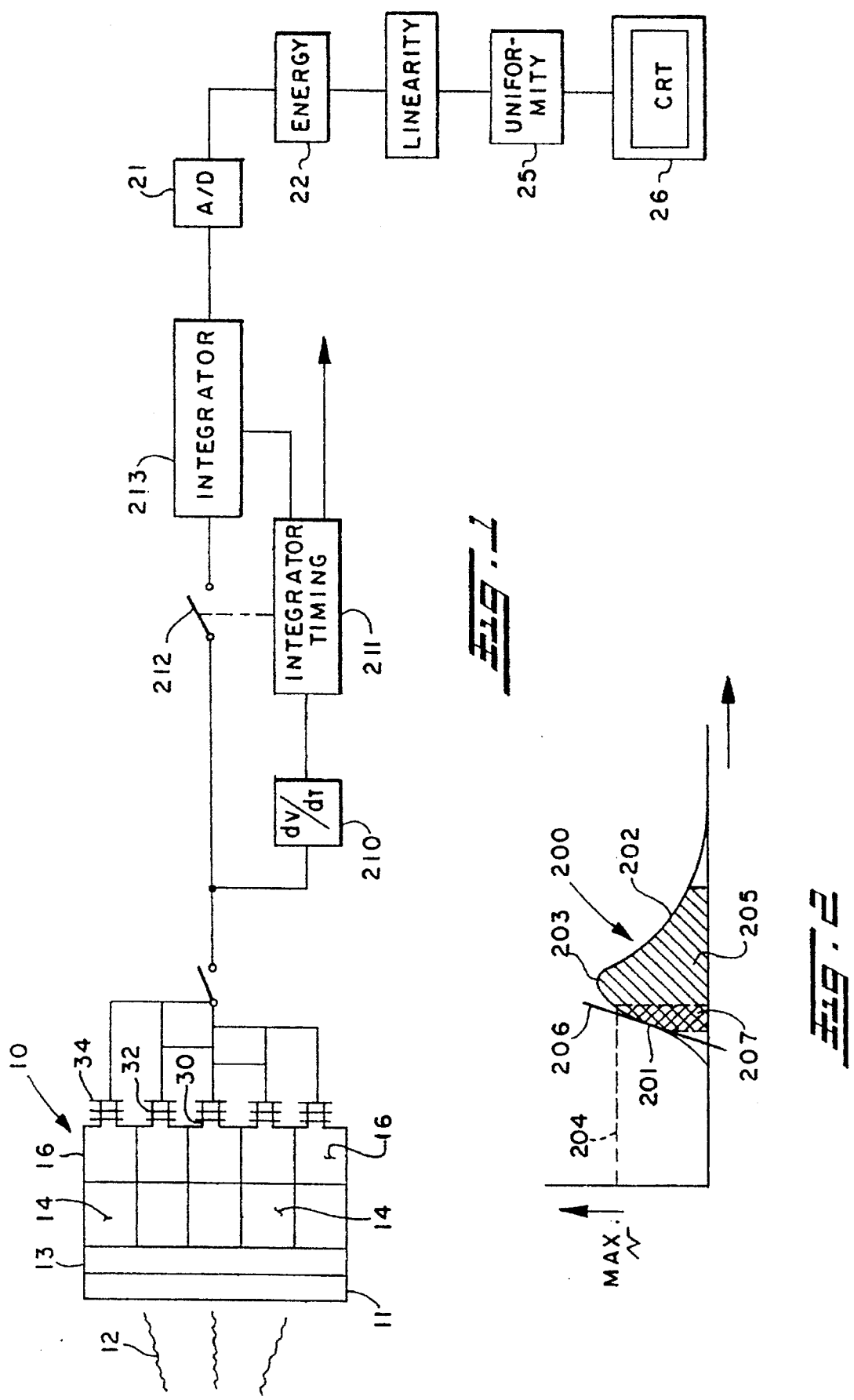

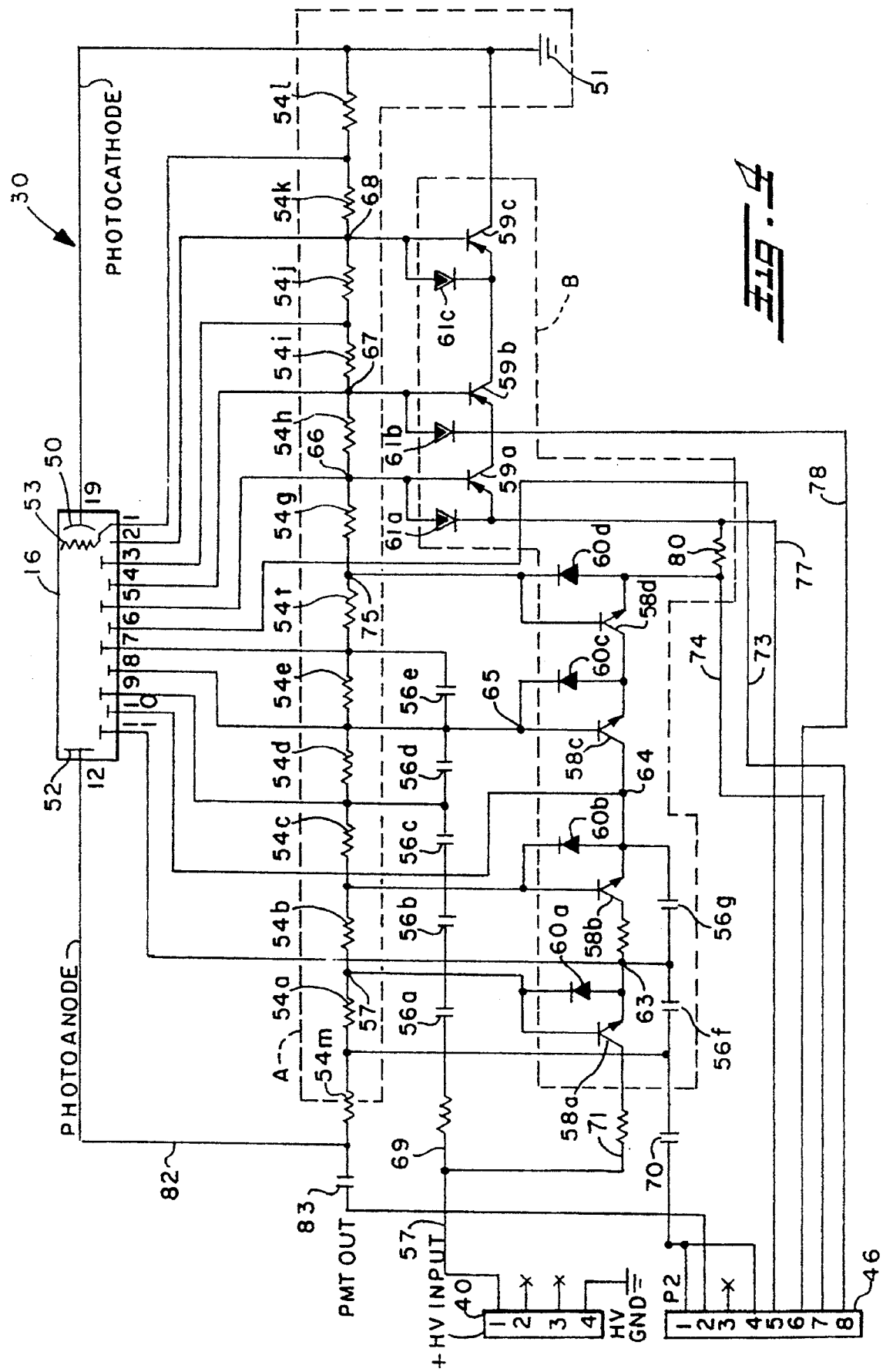

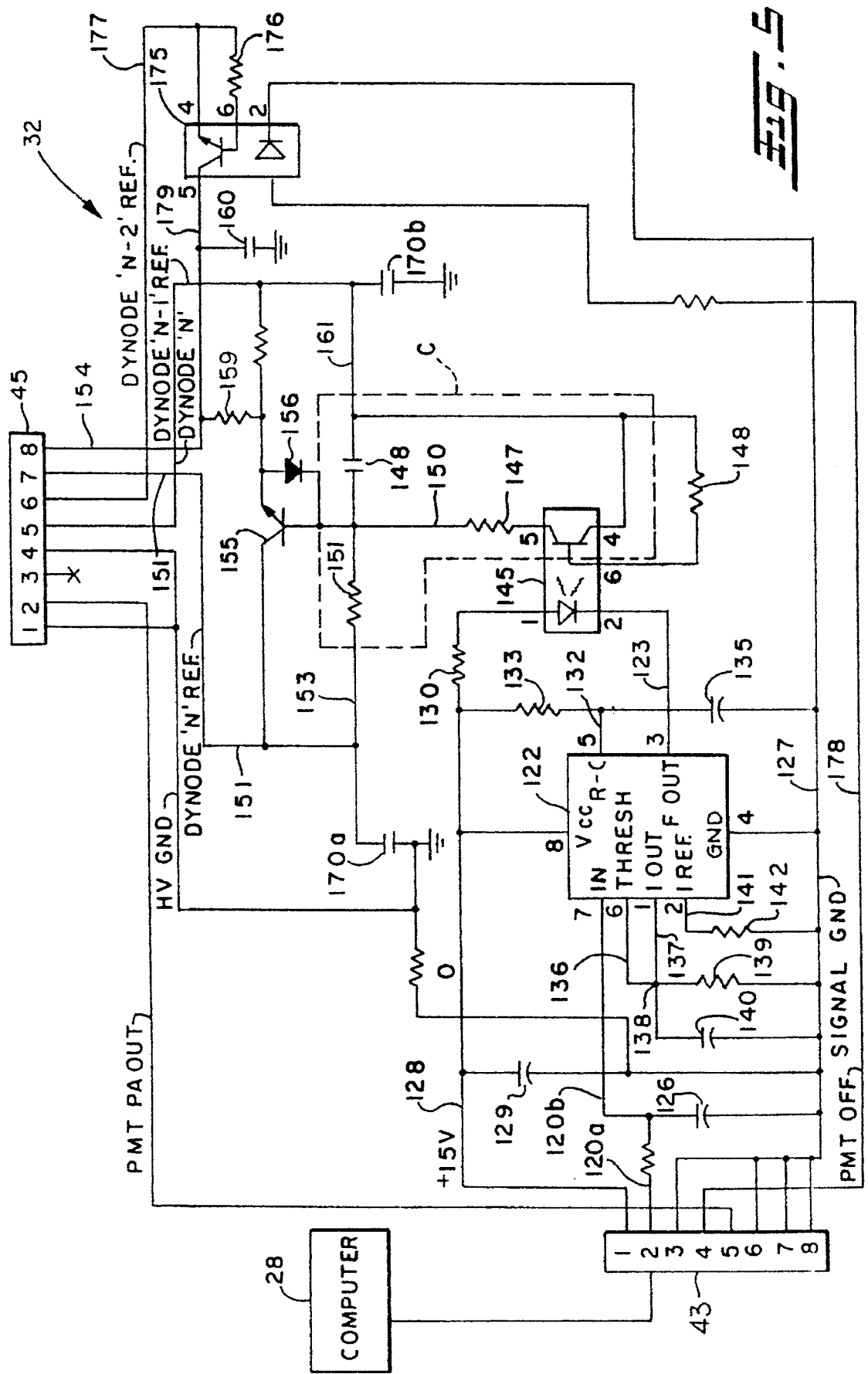

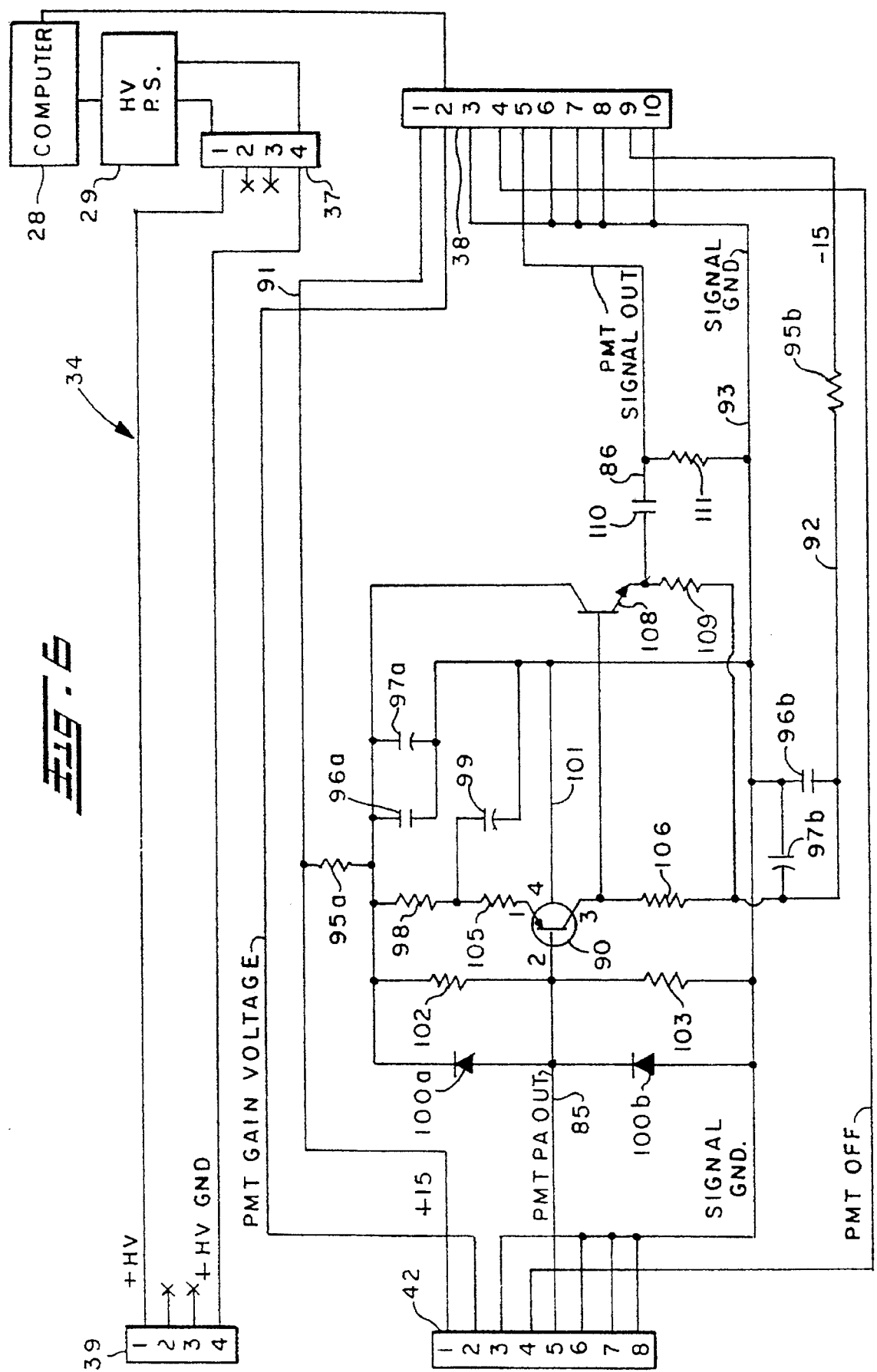

ELECTRONIC GAIN CONTROL FOR PHOTOMULTIPLIER USED IN GAMMA CAMERA

This is a continuation of application Ser. No. 247,063 filed May 20, 1994, now U.S. Pat. No. 5,493,610.

FIELD OF INVENTION

This invention relates generally to a gain control circuit for photomultipliers used in gamma cameras.

The invention is particularly applicable to and will be described with specific reference to a gain control arrangement for a gamma camera resulting in improved scintigrams. However, those skilled in the art will recognize that the invention may have broader application as a gain control for any photomultiplier utilized for photon counting.

INCORPORATION BY REFERENCE

The following United States patents are incorporated by reference herein so that details, concepts and structures known to those skilled in the art need not be repeated herein:

| U.S. Pat. No. | Title |
| --- | --- |
| 3,714,441 | Photomultiplier Gain Control Circuit |
| 4,091,287 | Scanning Radiology with Initial Scan for Adjusting System so that Detector Means Operates Within its Preferred Range |
| 4,808,826 | Smooth Dot Density Spatial Distortion Correction in Photon Imaging Devices |
| 4,866,615 | Scintillation Camera Compensation for Shifting the Center Channel of the Energy Spectrum Due to Photomultiplier Gain Change |

None of the patents incorporated by reference form a part of the present invention.

BACKGROUND OF THE INVENTION

All gamma cameras include a lead collimator through which gamma rays are passed so that only those rays parallel to the slits in the collimator strike a scintillation crystal. The light of individual scintillations emanating from the scintillation crystal is not collimated but spreads out and travels through light tubes or fiberoptics to strike a plurality of photomultipliers which are usually arranged in a hexagonal array. The location of the point of scintillation origin is then obtained by algorithms based on a weighted average which analyzes all the individual signals from the photomultipliers. Specifically, the electrons or signals produced in the photomultipliers in response to the photons detected are essentially counted in pulses. Each pulse is formed into an intensity signal, z, which is correlated to the energy of the sensed photon(s) and a position signal, x,y, which is correlated to the point where the signal originated. The x-y and intensity signals are then corrected for energy, linearity and uniformity and, after a sufficient number of counts have been obtained, form specific pixels on a CRT (cathode ray tube) screen where the image of the radiated organ is produced.

Photomultipliers for gamma cameras are supplied with gain control boards. Typically, the photomultipliers are matched in the array to have about the same gain. Generally speaking, differences in gain between photomultipliers are accounted for by computer weighting of each photomultiplier during camera calibration vis-a-vis look-up tables stored in computer memory. In some instances the photomultipliers are purchased with an adjustable gain control effected by a potentiometer which is manually set or adjusted to a desired gain so that all the photomultipliers in the camera can have approximately the same gain.

More specifically, photomultipliers are typically selected with gain characteristics which are sized to produce substantially linear outputs for the photon energy levels which are detected. The photomultipliers are then calibrated by exposing the camera to a uniform known radiation source. See for example U.S. Pat. Nos. 4,866,615, 4,091,287 and 4,808,826. Typically a pinhole or slotted aperture lead mask is positioned in front of a reference radiation beam which produces a uniform radiation signal for all the photomultipliers. Manufacturing variations between photomultipliers cause variations in the photoanode output signal or variations in gain to occur among the photomultipliers. Heretofore, the industry has "adjusted" the variations by simply comparing the signals from all the photomultipliers and factoring them, mathematically, so that each photomultiplier's signal are mathematically adjusted to have the same gain as that photomultiplier which is the least sensitive or has the smallest gain in the photomultiplier array. The "gain" values for each photomultiplier are then stored in a "look-up" table within the camera's computer. When the isotope for which the camera has been calibrated is used in a patient, the "look-up" table factors each photomultiplier signal by the value stored in the table. It is appreciated of course that there is a separate look-up table for each isotope which the camera senses, and it is not uncommon for there to be as many as 27 or so look-up tables corresponding to the different radioactive isotopes used in the medical field today.

It is, or should be, obvious that the greater the gain signal difference between photomultipliers for any given isotope, the more significant the factoring becomes leading to the possibility of error. It also should be recognized that the more complicated the factoring becomes to extrapolate gain signals from exponential curves, a large amount of computer memory is required and the time for calibration is increased accordingly.

Using photomultipliers with manually adjustable gain control mechanisms does not resolve the problem discussed above. First, while the gain for each photomultiplier can be set to the approximate gain of one another when the camera is calibrated for one specific isotope, the adjustment is only approximate. It can never be precise. Secondly, while an approximate adjustment can be made for one isotope the fact that any one specific photomultiplier may not be linear for another isotope means the differences have to still be accounted for by automatically factoring the signals during calibration before the signals are stored in the look-up table. Thus, while manual gain control adjustments are helpful in that at least there is an attempt to remove any significant disparity between photomultipliers, they are not a solution to the problem.

Apart from variations in gain between photomultipliers which are supposedly resolved during calibration, calibration is also used to remove the noise inherently present in the photomultiplier. That is with the photomultiplier off, a signal is still produced at the anode which is termed noise. This signal is measured, stored and subtracted from the output signal produced during operation of the photomultiplier. Various techniques have been used to shut off the photomultiplier such as by tying the dynodes in the divider voltage resistor string together which maintains voltage in the voltage divider resistor string while shutting off the photomultiplier.

As is well known, the gain characteristics of the photomultipliers change in time producing errors. See for example U.S. Pat. Nos. 4,866,613 and 4,808,826 where the problem is discussed at some length. The solution followed by the industry as a whole has been to modify the compensating tables to compensate for the photomultiplier gain change and in this manner produce an accurate picture. However, because the compensation table itself is not linear, it is quite possible that any modification thereof as well as the initial table, can in turn produce error.

Insofar as controlling the gain of a photomultiplier, reference should be had to *Photomultiplier Handbook*, by Burle Industries, Inc, copyrighted 1980 (Printed 1989) Chapter 5 which discusses various gain circuits. The Handbook notes that while a separate voltage supply could be used for each dynode in the photomultiplier, a resistive voltage divider circuit is generally utilized for the dynodes and that the first dynode region should have a high cathode-to-first-dynode voltage for certain applications. Gain is then usually controlled by adjusting the overall or line voltage inputted to the voltage divider string. To avoid space charge effect, current in the voltage divider circuit should be ten times the anode current which, in the case of high gain gamma cameras, result in high power dissipations causing resistor heat which, in turn, affect the linearity of the photomultiplier's output signal. The *Handbook* also notes that certain dynodes can be tied so that the photomultiplier need not operate with all its stages and that where the overall voltage is not to be changed, it is possible to set the gain by setting the voltage of a single dynode. The frequently employed method to establish gain is to simply vary the overall voltage. With respect to automatic gain control circuits, reference can be had to U.S. Pat. No. 3,714,441 which utilizes a comparator circuit to adjust the line voltage to maintain the photomultiplier's gain at a desired value.

SUMMARY OF THE INVENTION

Accordingly, it is a principal object of the invention, to provide an improved gain control for the photomultipliers used in a gamma camera to produce accurate and clear scintillation images.

This object along with other features of the invention is achieved in a scintillation gamma camera which has a plurality of photomultipliers. Each photomultiplier has within a vacuum enclosed space a photocathode, an anode and a plurality of dynodes spaced incrementally between the photocathode and the anode and numbered sequentially from the photocathode as $d_1$, $d_2$, $d_3$, etc. with any specific dynode designated as $d_n$. A line voltage potential arrangement which includes a resistor voltage divider string and a power supply applies a D.C. voltage to each dynode at incremental potentials corresponding to the numbering of the dynodes so that the voltage potential of one dynode is less than the voltage potential at the next numbered dynode etc. A conventional mechanism converts the electrical signals generated by the photomultipliers into a scintillation image. A gain mechanism is provided for electronically establishing the gain of each photomultiplier to be equal to one another in accordance with the radiation of a predetermined test beam. In accordance with the invention, the electronic gain mechanism includes an isolator arrangement for isolating the specific $d_n$ dynode from the voltage divider resistor string and a circuit is provided to connect the specific $d_n$ dynode to a DC voltage potential which is set anywhere between the voltage the specific $d_n$ dynode would have, had the specific $d_n$ dynode been inserted in the string and the lower voltage potential applied by the string to the dynode $d_{n-1}$ which is immediately adjacent to the position the specific dynode $d_n$ would have had in the string whereby the gain of the photomultiplier is determined by the voltage potential applied to the specific $d_n$ dynode.

In accordance with a more specific feature of the invention, the isolating arrangement includes a first tap line extending from the string to ground at a position whereat the tap line has a first reference string voltage, $d_{n\text{-}REF}$, which would have been applied to the specific $d_n$ dynode had the specific $d_n$ dynode been inserted into the string and a second tap line extending from the immediately preceding $d_{n-1}$ dynode and having the voltage potential of the string applied to the $d_{n-1}$ dynode. The connecting circuit includes a second resistive voltage divider for variably dividing the voltage between the first and second tap lines-which includes a control node connected to the specific $d_n$ dynode, a first resistor between the control node and the first tap line, a second resistor between the control node and the second tap line; a switch between the control node and the second line and a mechanism to control the opening and closing of the switch in accordance with a stored gain signal voltage whereby the voltage potential of the specific dynode $d_n$ is set at a voltage between the first and second tap lines. In this manner a carefully controlled voltage from the photomultiplier's resistor voltage divider string is tapped to accurately set the gain of the photomultiplier without any undue variations in voltage which might otherwise occur while allowing the line voltage to the photomultiplier to remain set at a constant optimum value for the sensed radiation.

In accordance with a still further specific and important feature of the invention, the switch mechanism includes an opto-isolator, and the switch control arrangement includes a voltage to frequency converter with a gain signal voltage correlated to the voltage imposed on the specific dynode $d_n$ inputted to the frequency converter so that the gain arrangement avoids generating excessive heat from the high dynode voltage potentials which could otherwise affect the linearity of the photomultiplier's response. R-C filters are used to smooth the switched voltages to produce a constant voltage applied to the specific $d_n$ dynode.

It is another object of the invention to provide an improved gain control for a photomultiplier and like devices which accurately establishes the gain of the photomultiplier in accordance with a preset gain control signal.

Yet another specific object of the invention is to provide an electronic gain control arrangement for a gamma camera which assures the integrity of the voltage divider resistor string in the photomultiplier and then taps the string to produce a precise, consistent gain voltage for each photomultiplier within the camera.

Still another general object of the invention is to provide a gain control mechanism for any photomultiplier used to convert photons into electrical impulses which can accurately be adjusted within the range of 100% down to about 50% of the voltage output for any given photomultiplier.

A still further object of the invention is to use an electronic gain control circuit for a photomultiplier which minimizes heat generated during operation of photomultiplier thus improving the linearity of the photomultiplier response.

A still further object of the invention is to provide a simple shut off circuit for a photomultiplier which can be operated to shut off selected photomultipliers in a gamma camera array.

It is another general object of the invention to provide an electronic gain control circuit for a photomultiplier or an array of photomultipliers whether or not said photomultipliers are used in a gamma camera or other photon detecting device.

Still another more specific and important feature of the invention is to provide a gain control for a photomultiplier which establishes the gain of the photomultiplier while insuring the integrity of the dynode voltage divider string to minimize voltage variations between dynodes or stages.

These and other objects of the invention will become apparent to those skilled in the art upon reading and understanding the Detailed Description of the invention set forth below.

BRIEF DESCRIPTION OF THE DRAWINGS

The invention may take physical form in certain parts and arrangements of parts, a preferred embodiment of which will be described in detail and illustrated in the accompanying drawings which form a part hereof and wherein:

FIG. 1 is a general schematic view of a gamma camera including the basic signal information components shown in block form.

FIG. 2 is a graph of an electrical pulse produced by the photomultiplier as a result of a gamma ray producing a burst of scintillated light;

FIG. 4 is an electrical circuit schematic of the voltage divider board shown in FIG. 3;

FIG. 5 is an electrical circuit schematic of the gain control board shown in FIG. 3;

FIG. 6 is an electrical circuit schematic of the preamp board shown in FIG. 3;

DETAILED DESCRIPTION OF THE INVENTION

Figure 3:
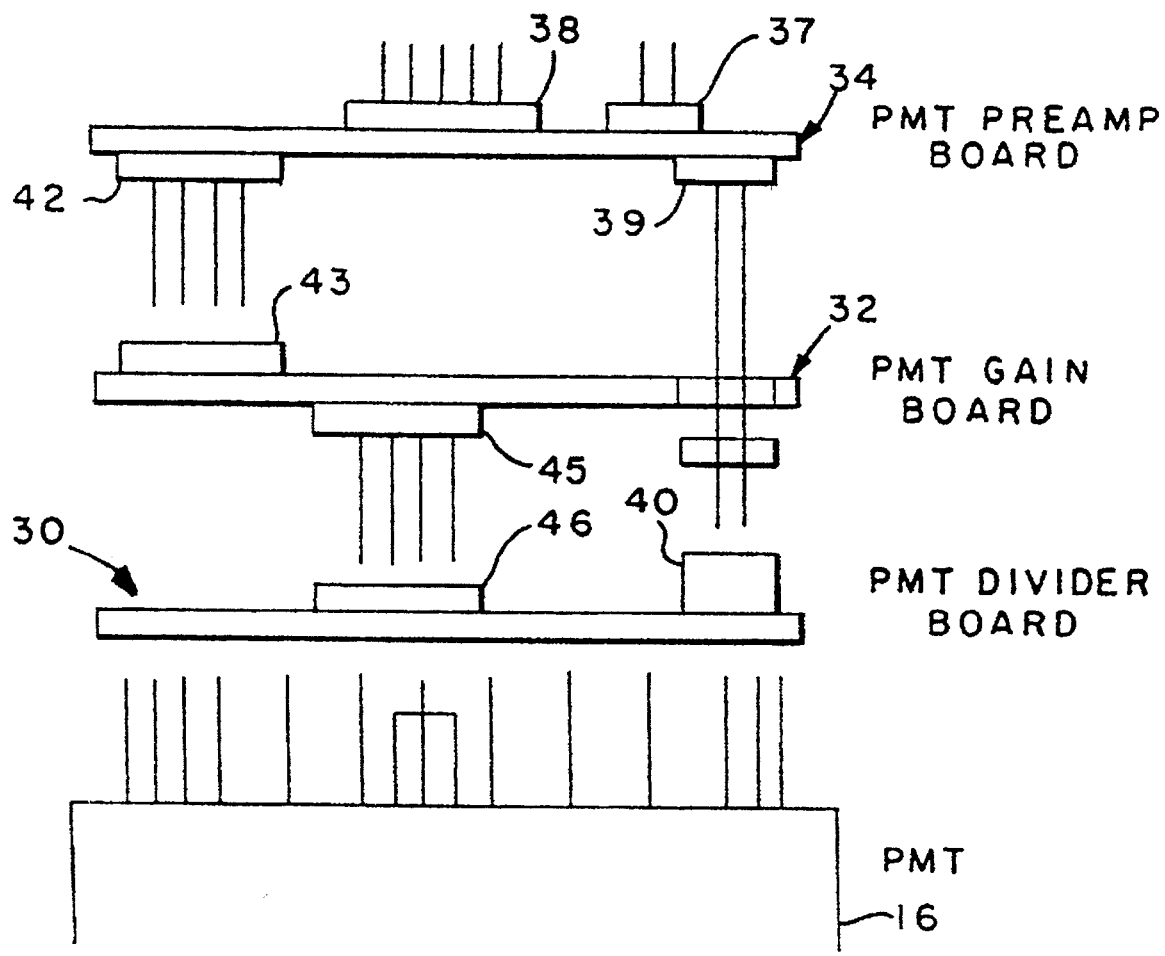
FIG. 3 is a schematic representation of the circuit boards attached to the photomultiplier showing the connections therebetween.

Referring now to the drawings wherein the showings are for the purpose of illustrating a preferred embodiment of the invention only and not for the purpose of limiting same, there is shown in FIG. 1, in general schematic form a nuclear camera 10 of the Anger type. Camera 10 includes a lead collimator 11 for catching and directing certain parallel incident rays of radiation 12 onto a scintillation crystal 13. As is known in the art, radiation rays are emitted from the organs of a patient as a result of a radioactive isotope such as iodine ingested by the patient. Scintillation crystal 13 in turn produces as a result of absorbing a ray of radiation 12 a burst of light which is directed by light tubes 14 onto the photocathode of a plurality of photomultiplier tubes 16 hereinafter referred to as photomultiplier or PET.

In camera 10 of the preferred embodiment scintillation crystal 13 is rectangular (about 20"× 26") and photomultipliers 16 have hexagonal face plates and are packed in a hexagonal array of 58 tubes. Photomultipliers 16 emit photoelectrons from the scintillated burst of light which are created by the photocathode and are directed by an appropriate electric field to an electrode or dynode which in turn emits a greater number of secondary electrons directed to the next dynode etc., until a high gain of electrons are collected by the anode which provides a signal output current correlated to the incident ray of radiation. "Gain" as used in this specification will have the meaning ascribed it as set forth in the *Photomultiplier Handbook*, namely, "the ratio of (1) the output signal current to (2) the photoelectric signal current from the photocathode". The radiation signal produced by photomultipliers 16 is amplified and directed to an analog to digital converter 21 where it is digitized and the digitized radiation signal is then corrected for i) energy distortion by an energy distortion circuit 22, ii) linearity through a linearity circuit 24 and iii) uniformity through a uniformity circuit 25. The reformed radiation signal is then inputted to a cathode ray tube 26 where each signal produces pixels of various shades which make up a scintigram. As thus far described, camera 10 is conventional.

As noted in the Background Discussion, the prior art cameras which do not have an adjustable gain for each photomultiplier factor the photomultiplier tube's output signal vis-a-vis look up tables stored in the computer's memory and generated during calibration of the camera. In theory, the factoring can be done before radiation signal is digitized, or after it is digitized or the algorithms in the correcting circuits 22, 24 and/or 25 can account for the factoring since the correction circuits are essentially factoring the radiation signal in accordance with their own tables. On those cameras where photomultipliers 16 are supplied with an adjustable gain control, a technician manually adjusts each photomultiplier so that the gain of each photomultiplier approximately equals the lowest gain obtained by the least responsive photomultiplier for one specific test radiation beam. Since the adjustment is manual and other isotopes produce different photomultiplier gains which will inevitably not produce the same gains for all the photomultipliers, look-up factoring tables still exist and the process continues in the same manner as it does for photomultipliers 16 with a fixed gain. In accordance with the present invention gain adjustment of each photomultiplier 16 is accomplished electronically for each radioactive isotope sensed by camera 10 and the adjustment is such that all photomultipliers have the same gain although that gain may very well be different for each isotope. The gain adjustments are effected by individual PMT gain signals stored in the camera's computer when camera 10 is calibrated. Calibration and recalibration, when necessary, is an automatic event once camera 10 is positioned within the proper calibrating grids and subjected to test radiation beams as described hereafter.

The electronic circuits which adjust the gain of each of the 58 photomultipliers 16 are shown in FIGS. 3–6. As best shown in FIG. 3, the circuits are contained on three printed circuit boards which are a voltage driver or divider circuit board 30 (FIG. 4), a gain control circuit board 32 (FIG. 5), and a preamp circuit board 34 (FIG. 6). Circuit boards 30, 32, and 34 are mounted to the rear of photomultiplier 16 with the divider board making contact with the photocathode, anode and dynodes of photomultiplier tube 16. Power and interconnections between circuit boards 30, 32, and 34 are through several connectors.

Specifically, there are two external connectors 37, 38 mounted to preamp circuit board 34. External connector 37 is a 4 pin connector which connects to a 4 pin preamp board connector 39 on preamp circuit board 34 which in turn connects to a 4 pin board connector 40 on voltage divider circuit board 30. All connector pins are shown in the drawings numbered sequentially from reference numeral 1 in FIGS. 4–6 and for 4 pin connectors 37, 39, 40 the pin designations are as follows:

| Connectors 37, 39, 40 Pin No. | Function |
| --- | --- |
| 1 | +HV Input (from HV Power supply) |
| 2 | NC (no connection) |
| 3 | NC (no connection) |
| 4 | Gnd |

A ten pin external connector 38 is also provided preamp circuit board with pin designations as follows:

| Connector 38 Pin No. | Function |
| --- | --- |
| 1 | +15V |
| 2 | PMT Gain Volt (from computer) |
| 3 | Signal Gnd |
| 4 | PMT Off |
| 5 | PMT Signal Out |
| 6 | Signal Gnd |
| 7 | Signal Gnd |
| 8 | Signal Gnd |
| 9 | –15V |
| 10 | Signal Gnd |

In addition, preamp circuit board 34 has an 8 pin board connector 42 which connects to an 8 pin board connector 43 on gain control circuit board 32. Connector pins are numbered and designated in function as follows:

| Connector 42, 43 Pin No. | Function |
| --- | --- |
| 1 | +15V |
| 2 | PMT Gain Volt (from computer) |
| 3 | Signal Gnd |
| 4 | PMT Off |
| 5 | PMT PA (Photo Anode) out |
| 6 | Signal Gnd |
| 7 | Signal Gnd |
| 8 | Signal Gnd |

Also, gain control circuit board 32 has an 8 pin board connector 45 which connects to an 8 pin board connector 46 on voltage divider board 30, Connector pins are numbered and designated in function as follows:

| Connector 45, 46 Pin No. | Function |
| --- | --- |
| 1 | +HV Gnd |
| 2 | PMT PA out |
| 3 | NC (no connection) |
| 4 | +HV Gnd |
| 5 | Dynode N-1 Ref |
| 6 | Dynode N-2 Ref |
| 7 | Dynode N Ref |
| 8 | Dynode N |

Referring first to the resistor voltage divider circuit shown in FIG. 4, photomultiplier 16 has its photocathode 50 connected to ground 51 and its anode 52 at positive line voltage which is outputted to pin 2 of connector 46. Photomultiplier 16 has ten stages or dynodes (excluding focus electrode 53) which are labelled in FIG. 4 as "dynode 1" through "dynode 10". A venetian blind photomultiplier is schematically illustrated and is, in fact, used in the preferred embodiment. However, other photomultiplier designs can be used and various numbers of dynodes or stages can be used.

As noted above, high voltage to photomultiplier tube 16 is inputted at pin 1 of internal connector 40. As will be explained below, the high voltage is constant but its voltage is set by the camera's computer 28 (FIG. 6) to be at an optimum voltage for the specific radioactive isotope which camera 10 is sensing. It is also to be understood that one power supply (shown schematically in FIG. 6 as reference numeral 29) furnishes the power at a preset DC voltage for all 58 photomultipliers 16 used in camera 10. This permits conventional techniques to be used to closely regulate the input voltage to assure steady state high voltages for all PMT's. The input voltage which determines the overall gain or limits of the maximum gain of photomultiplier 16 can be preset anywhere from about 600 to 1500 volts D.C. depending on the isotope being sensed.

The inputted high voltage is at a high point at node 57 of FIG. 4 and is divided somewhat equally among the dynodes or stages by a resistive or resistor voltage divider string placed across the high voltage source, i.e., node 57 and ground 51 which string is generally contained within the dot-dash envelope designated "A" in FIG. 4. That is a plurality of equally sized resistors 54a through 54l connected in series divides the high voltage equally among the ten dynodes. (All electrical circuit components shown in the drawings which are identical will have the same reference numeral assigned to the component. Any specific component discussed in the specification will be distinguished from other identical circuit components by the letter subscript following the reference numeral. Thus, the 12 resistors identifying the resistor voltage divider string A for the 10 stage (plus focus electrode 53) photomultiplier 16 are identified by subscripts "a" through "1" following reference numeral 54.) For ease of discussion all resistors 54 are equal, but are not required to be equal in a given application. Thus, assuming an input voltage of 1500 volts the voltage potential between adjacent dynode varies incrementally by 125 volts. Specifically focus electrode 53 is at 125 volts, dynode 1 is at 250 volts, dynode 3 is at 375 volts, etc. until dynode 10 is at 1375 volts. In practice, the resistors at focus electrode 53 and dynode 1 are at higher resistances than the other resistors so that a greater voltage potential exists at focus electrode 53 and the first dynode. The resistive voltage divider is conventional as is the high voltage potential for the cathode and first dynode region and is discussed at pages 81–83 of the *Photomultiplier Handbook* (incorporated by reference herein).

Also, divider circuit 30 uses charge storage capacitors 56 connected in series with one another. Because the radiation detected by camera 10 emits pulses of light, the output signal produced at anode 52 of photomultiplier 16 is in the form of pulses. The resistance of the voltage-divider network discussed above is based on the average anode current. When the average anode current is much less than the peak pulse current, the dynode potentials can be maintained at a nearly constant value during the pulse duration by use of charge-storage capacitors. The *Photomultiplier Handbook* suggests that the capacitors be located at the dynode socket and discloses series or parallel examples for all photomultiplier stages with capacitance increasing as the stages approach the anode. In the FIG. 4 circuit of the present invention, there are only five equal fixed charge capacitors 56a through 56e for dynodes 10 through 6 because, as shown in the table below, the number of secondary electrons emitted (and thus the PMT current) increases significantly only for the last photomultiplier stages.

There are four NPN transistors 58a, b, c, and d in series with one another and three PNP transistors 59a, b, and c in series with one another which are connected together in a transistor string to ground shown generally within a dot-dash envelope designated "B" in FIG. 4. Each NPN transistor 58 has, respectively, a diode 60a, b, c and d, associated therewith and each PNP transistor 59 has, respectively, a diode 61a, b and c associated therewith. By connecting each diode to the transistor base as shown, a forward voltage is set by the diode to protect transistor 58, 59 from turn-on/turn-off transient voltages or current while also functioning to protect the transistor in the event of a PMT failure. NPN transistor 58a's emitter connects at node 63 to dynode 10. NPN transistor 58b connects at node 64 to dynode 9. NPN transistor 58c's base connects at node 65 to dynode 7. NPN transistor 58d's base connects to node 75. PNP transistor 59a's base connects at node 66 to dynode 4. PNP transistor 59b's base connects at node 67 to dynode 3 and PNP transistor 59c's base connects at node 68 to dynode 1.

As is well known, the dynode current increases significantly at the last dynode stages. For example, the dynode current distribution for a 100 μa photoanode current is typically as follows:

| Dynode | Dynode Current | Drop Across 1 mΩ |
| --- | --- | --- |
| 1: | 6.67 × 10⁻⁴ μa | 6.67 × 10⁻⁴ v |
| 2: | .002 μa | 2 mv |
| 3: | .007 μa | 7 mv |
| 4: | .024 μa | 24 mv |
| 5: | .028 μa | 78 mv |
| 6: | .258 μa | 258 mv |
| 7: | 0.85 μa | 850 mv |
| 8: | 2.8 μa | 2.8 v |
| 9: | 9.221 μa | 9.22 v |
| 10: | 30.366 μa | 30.36 v |
| Photoanode: | 100 μa | 100.00 v |

Further, the *Photomultiplier Handbook* suggests for linear response purposes that the voltage divider current be 10 times the photoanode current. Following the *Handbook* recommendations, and given the dynode current levels, high heat from current flow through the resistors will be generated even if a tapered divider network (varying resistances) is used. By using the emitter-follower characteristic of transistors 58 it is possible to provide a power supply requiring much less divider current and thus less heat. As is well known, heat adversely affects the linearity of the photomultiplier's response. In the circuit shown in FIG. 4, as the dynode current increases, the added current is diverted from transistors 58 rather than from the resistor-capacitor divider string. This results in significantly improved voltage regulation between the dynodes which remains constant and at a lesser current draw than the 10 to 1 suggestion of the *Photomultiplier Handbook*. Thus, a constant, non-varying voltage potential between dynodes with less heat from current flow is obtained by the FIG. 4 circuit. Reference can be had to FIG. 96 in the *Photomultiplier Handbook* for a different active divider network also using transistors to divert the added dynode current from the resistor-divider string.

In the present invention and from a study of the PMT dynode current table shown above, only the dynode current from the last and second last dynodes, dynodes 10 and 9, are significant. Thus, the heat resulting from the added current is dissipated by transistors 58a and 58b and the current is high enough for additional charge-storage capacitors 56f and 56g to be used to smooth the pulses. Thus, transistors 58a and 58b dissipate heat. To completely isolate the added PMT dynode current from the resistor voltage divider string A, (and unlike the FIG. 96 *Photomultiplier Handbook* circuit), a series transistor string B connected to ground 51 is constructed. Since the dynode current is dropping, NPN transistors 58a–d are used for the higher voltage stages and connect collector to emitter to "push" the current and PNP transistors 59a–c are used for the lower voltage stages and connect emitter to collector to "pull" the current to ground 51. A resistor 80 is used as a "keeper" to maintain current flow from the NPN transistors to the PNP transistors to maintain the series connection of the transistor string B.

Also shown in FIG. 4 is resistor 69 and capacitor 70 which act as an RC filter for the high voltage to remove spikes or glitches. The anode output signal from photomultiplier 16 is outputted on line 82 through coupling capacitor 83 to pin 2 of connector 46.

At pin 8 of connector 46, a dynode "N" voltage potential is directly inputted to dynode 5 on line 73. In the preferred embodiment dynode 5 is the specific, string isolated dynode, $d_n$, which has a preset voltage that determines the gain of photomultiplier 16. At first pin 5 of connector 46 a dynode "N reference" voltage connects on tap line 74 to node 75 on the resistor voltage divider string between resistors 54f and 54g which would be the node in the resistor voltage divider string A where dynode 5 would have connected had line 73 not existed. As will be shown in the description of gain circuit 32, tap line 74 insures that resistor divider voltage potential distribution on string A remains intact while the voltage potential at dynode 5 is determined solely by the voltage of line 73. In this manner, dynode $d_n$ is isolated from resistor voltage divider string A. In addition, a second tap line 77 from pin 5 of connector 46 has a voltage potential shown as dynode "N-1 reference" which in turn is connected at node 66 to dynode 4 through PNP transistor 59a. Second tap line 77 is thus at the voltage potential applied to the immediately adjacent dynode $d_{n-1}$ closer to photocathode by resistor voltage divider string A. Also, a third tap line 78 from pin 6 of connector 46 has a voltage potential referred to as dynode "N-2 reference" applied to dynode 3 at node 67 through PNP transistor 59b. Third tap line 78 is thus at the voltage potential applied by resistor voltage divider string A to dynode $d_{n-2}$ which is immediately adjacent dynode $d_{n-1}$ on the side towards photocathode 50. Resistor 80, as noted, interconnects dynode $d_{n\text{-}REF}$ tap line 74 with dynode $d_{n-1\text{-}REF}$ tap line 77 and acts as a current keeper maintaining PNP transistors 59 in series with NPN transistors 58.

It is important to note that the voltages on tap lines 74, 77 and 78 are determined solely by resistor voltage divider string A because transistor string B has removed any adverse influence attributed to the PMT dynode current. Further, the high voltage to resistor voltage divider string A is constant. Thus, an accurate, uniform basis is established to regulate the voltage on dynode $d_n$ which helps remove any individual PMT dynode $d_n$ (dynode 5 in the preferred embodiment) voltage variation which can result in influencing the gain set for each photomultiplier 16.

Referring now to FIG. 6, there is shown a somewhat conventional amplifier circuit in which the output signal 82 from anode 52 of photomultiplier 16 is inputted to preamp circuit board 34 through pin 5 of connector 42 on line 85 and is outputted as an amplified signal on line 86 to pin 5 of external connector 38 where the signal is sent to an integrator for reformation into the x, y and signals. The photomultiplier anode output signal is amplified by transistor 90 functioning as an inverting amplifier (shown as reference numeral 20 in FIG. 1). Because the light pulses arise and diminish over a time span measured in nanoseconds, "standard" type operational amplifiers take too long a time to recover from an input overload condition (background radiation) to function satisfactorily for this application. Thus, transistor 90 is selected as a RF (radio frequency) transistor which has a response time in nanoseconds. Apart from the selection of an RF transistor as an amplifier for a gamma camera application, amplifier circuit 34 is somewhat conventional.

Amplifier circuit power in is at plus 15 volts at pin 1 on line 91, and minus 15 volts at pin 9 on line 92 of external connector 38 thus providing a dual plurality power supply. Signal ground is on line 93. Power supply filters are provided by resistor 95a and capacitors 96a and 97a and similarly by capacitors 96b and 97b and resistor 95b and also by resistor 98 and capacitor 99. Diodes 100 a, b function as input protectors for the anode signal connected to the base of transistor 90. Because RF transistor 90 is metal shielded, the shield is connected to ground on line 101. Base resistors 102, 103 form a voltage divider and are sized to properly fix the base voltage, more specifically the bias current or "Q" point of transistor 90. Emitter resistor 105 and collector resistor 106 set a fixed gain to transistor 90 in proportion to the resistance value of collector resistor 106 to emitter resistor 105 (i.e., the ratio of 106/105). In conventional photomultiplier amp circuits, an adjustable gain of the photomultiplier could be effected by substituting a potentiometer for collector resistor 106 so that its resistance can be varied. In accordance with the invention, the resistances are fixed since the circuits disclosed will establish a fixed gain for photomultiplier 16. Finally, a NPN transistor 108 is provided as a voltage follower having an emitter resistor 109. Signal output from transistor 108 passes through a coupling capacitor 110 and output line 86 is connected to signal ground through resistor 111.

Gain control circuit 32 is disclosed in FIG. 5. A photomultiplier gain signal is inputted to gain control circuit 32 on line 120a through pin 2 of connector 43. The gain signal is established by computer 28 which determines the gain for each photomultiplier 16 during calibration. In accordance with the invention, gain control circuit 32 electronically adjusts the gain of photomultiplier 16 and also provides a control to shut off photomultiplier 16. The general principle by which this occurs is discussed below.

Photomultiplier Gain Control System

Figure 7:
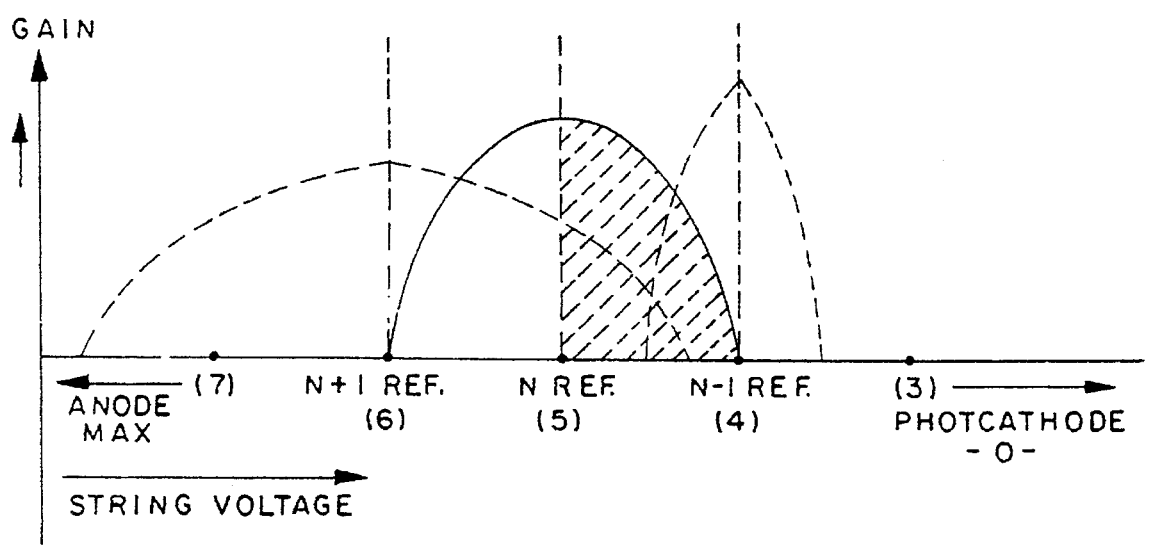
FIG. 7 is a graph of the voltage potential range of a given dynode.

The technique by which a Photomultiplier Tube's (PMT's) gain can be controlled is achieved by varying the voltage on a given dynode with respect to the 2 adjacent dynodes. Typically, the dynodes in a PMT are tied in a linearly increasing voltage potential (from photocathode to photoanode) and electrons are accelerated from dynode to dynode due to the positive voltage gradient seen from the previous dynode to the next dynode. This invention takes one of the dynodes in the linear voltage string and changes the voltage on a specific dynode such that the acceleration potential for the electrons coming from the previous dynode is changed. For example, if a 10 dynode PMT has a total applied voltage of 1100 volts and the voltage is equally divided among the 10 dynodes, each dynode will have an increased voltage potential of 100 volts (e.g. dynode 1 is at 100V, dynode 2 is at 200V, etc.). To control the gain of the PMT tube, dynode 5 (which normally sits at 500V) is varied from 400V (dynode 4 potential) to 600V (dynode 6 potential). This is graphically illustrated for the gain of dynode "n" in FIG. 7. None of the other dynode voltages are varied in this gain adjustment. Variations in gain in excess of 50% can be realized using this technique.

While in theory the voltage potential on a given dynode can vary between the voltage of adjacent dynodes $d_{n+1}$ and $d_{n-1}$, in the preferred embodiment the gain is accomplished by varying the voltage of $d_n$ between the voltage $d_n$ would normally have had in the voltage-divider string A $d_{n\text{-}REF}$ and the lesser voltage of the immediately preceding dynode $d_{n-1}$. This is shown by the shaded area of the gain curve in FIG. 7, since the gain curve is symmetrical about its mid-point. Alternatively, the gain could be adjusted between $d_{n\text{-}REF}$ and the immediately succeeding dynode $d_{n+1}$. In accordance with the broad concept of the invention, the voltage potential $d_n$ can vary anywhere between the voltage which would have been applied to dynode $d_n$ if inserted in resistor voltage divider string A ($d_{n\text{-}REF}$) and the voltage at any point on the resistor voltage string. Further, while the gain of photomultiplier 16 could be controlled by so varying the potential on any given dynode, it is preferred to vary the potential of a dynode in the middle of resistor divider voltage string A since the early stages have few secondary electrons and the later stages have a large number of secondary electrons thus making gain adjustments difficult. This is diagrammatically illustrated by the dash lines illustrating gain for dynode 6 and the dash lines indicating gain for dynode 4. Stability is best achieved by selecting amid-point dynode such as dynode 5 for the best overall gain control in the preferred embodiment.

PMT Gain Shutdown Control

The gain adjustment can be increased beyond 50% by taking the voltage of the specified dynode beyond the limits of the adjacent dynode's potentials. If, for example, in the above scenario the potential of dynode 5 (dynode $d_n$) was taken to 300V (dynode 3 or dynode $d_{n-2}$ potential), the electrons are actually repelled coming off of dynode 4 (dynode $d_{n-1}$) and effectively shut the tube off. The advantage of using this technique over just tying the first several dynodes together is that there is no buildup of electrons from previous gamma events hitting the photocathode. Heretofore, these free electrons collect on the photocathode and when the acceleration potential is re-applied, there is surge of current resulting from purging the previous history of gamma events. By repelling the electrons in the series dynode string, these electrons from the previous dynode are re-absorbed and the pulse of current is absent upon reapplication of the PMT to normal operation.

More specifically in FIG. 5, the gain voltage signal 120 is inputted to a voltage-to-frequency converter chip 122 which is a National Semiconductor LM331 chip. The pins numbered 1 to 8 in FIG. 5 correspond to the pin numbers set forth in the technical specifications for the National Semiconductor LM 331 chip and reference can be had to the chip specifications for an understanding of the integrated circuits used in the chip. Insofar as the invention is concerned, a square wave output is applied to pin 3 of chip 122 onto line 123 with the relative duration or the time the voltage is on and off determined by the voltage of PMT gain signal voltage on line 120 which is set by computer 28. The time of the on cycle is set by RC pin 5 on line 132. Insofar as the external circuit connections to chip 122 are concerned, gain signal 120a is filtered by resistor 125 and capacitor 126 which is connected to signal ground 127 and gain signal 120b can vary anywhere from 0.0 volts for maximum gain to 2.5 volts for minimum gain. Supply voltage 128 of 15 volts from pin i of connector 43 is filtered through capacitor 129 (which in turn is connected to signal ground 127) and supply voltage 128 is also connected to resistor 130. Control voltage on line 132 into pin 5 of chip 122 connects through resistor 133 to supply voltage 128 and to signal ground 127 through capacitor 135. Threshold current on line 136 (pin 6) and output current on line 137 interconnect at node 138 to resistor 139 in parallel with capacitor 140, both connected to signal ground 127 and functioning to trigger the timing cycle whereat capacitor 140 is charged from 137 (pin 1 of chip 122) and discharges itself through resistor 139. Finally, reference current on line 141 (pin 2) (which programs $I_{out}$ from pin 1 of 137) connects to signal ground 127 through resistor 142 and chip ground (pin 4) connects to signal ground 127.

Figure 5A:
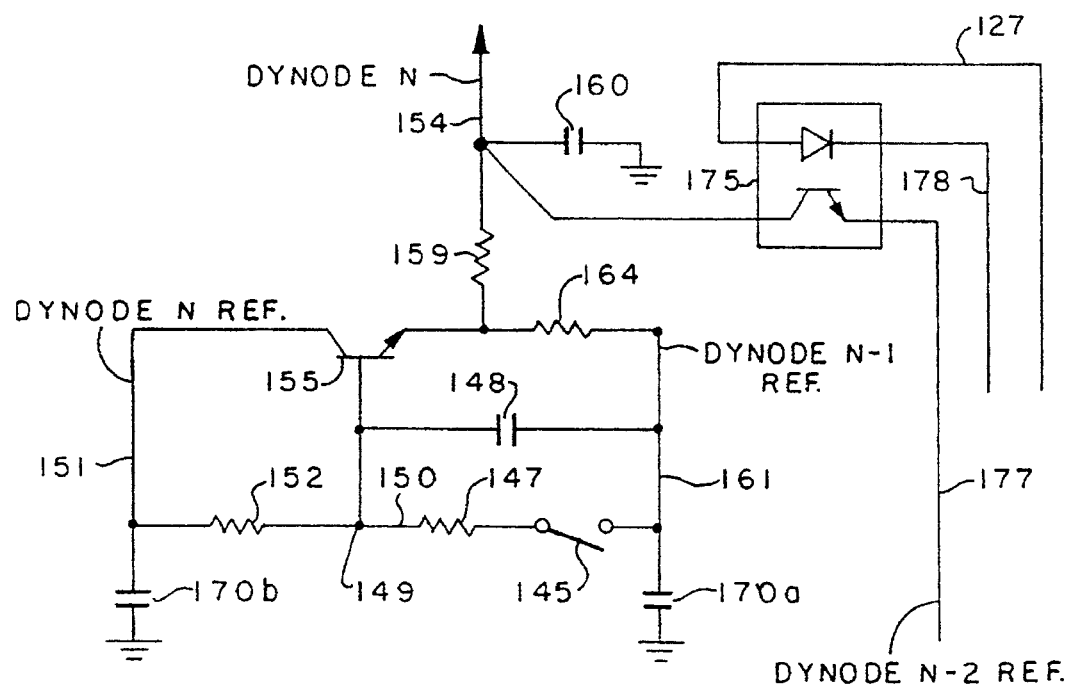
FIG. 5a is a redrawn portion of the voltage divider circuit used in the gain control board shown in FIG. 5.

As shown in FIG. 5 frequency output (pin 3) from chip 122 connects to an opto-isolator 145 which is basically an LED switch in turn controlling a gain resistor voltage divider string shown generally by the dot-dash envelope designated "C" in FIG. 5 and redrawn in FIG. 5a for discussion purposes. Conceptually, when the LED doesn't light, the switch is off, and the voltage dynode$_{n\text{-}REF}$ from resistor voltage divider string A is inputted to dynode$_n$. This is the same voltage potential which would have been applied to dynode$_n$ had dynode$_n$ been inserted into resistor voltage divider string A. When the diode lights the voltage potential from dynode$_{n-1}$ from resistor divider string A is applied to the gain resistor voltage divider string C. The voltage applied to dynode$_n$ at this time is a filtered ratio (set by resistors 147 and 152 and easily calculated by those skilled in the art) and ends up being between dynode$_{n\text{-}REF}$ and dynode$_{n\text{-}1REF}$. Thus, in the preferred embodiment the limits of the gain control is set by the ratio of resistors 147 and 152. In theory, if more of the photomultiplier's gain had to be controlled, the ratio of resistor 147 to 152 would be changed. If necessary, a different preceding dynode potential voltage could be tapped, such as d$_{n-2}$, and the switch controlled to input a lower voltage potential to dynode$_n$. Thus, the frequency of opening and closing of switch or opto-isolator 145 (which, in turn, is set by PMT gain voltage on line 120a,b) determines the voltage applied to dynode$_n$ which can control the gain of photomultiplier 16. R-C filters are then employed in the circuit to develop a steady state gain control.

Figure 8A:
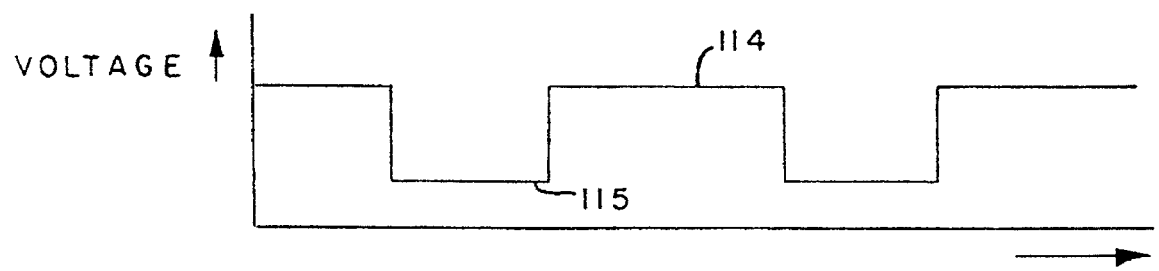
FIG. 8a is a graph of the voltage frequency output from a voltage to frequency converter used in the gain control circuit shown in FIG. 5.
Figure 8B:
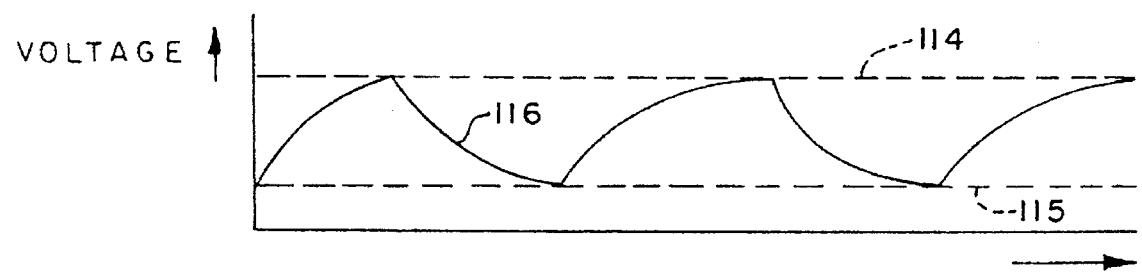
FIG. 8b is a graph of the voltage frequency shown in FIG. 8a but in a filtered state.
Figure 8C:
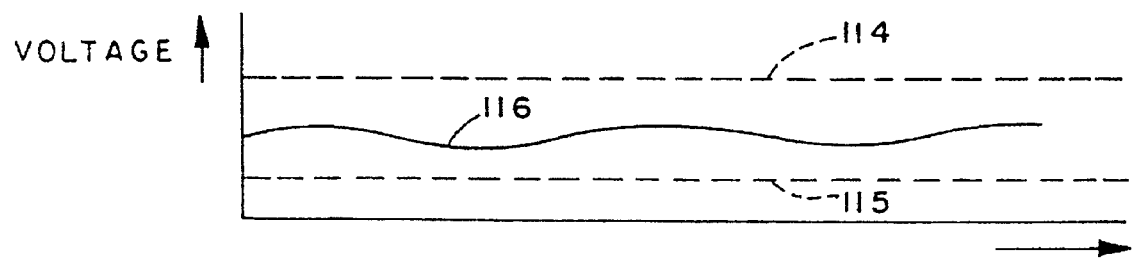
FIG. 8c is a graph of the voltage frequency shown in FIGS. 8a and 8b in a final filtered, steady-state condition.

This is graphically shown in FIGS. 8a, 8b and 8c. More specifically, FIG. 8 shows the unfiltered voltage with the switch or opto-isolator 145 in its "on" and "off" position. When "off" the voltage to dynode$_n$ is dynode$_{n\text{-}REF}$ voltage as discussed above and is indicated by line 114. When "on" the voltage to dynode$_n$ is the ratio of voltages set by resistor 149 and 152, being between the voltages of dynode d$_{n\text{-}REF}$ and dynode$_{n\text{-}1REF}$ as discussed above and as indicated by line 115. FIG. 8b shows the voltage after it passes through the first filter and FIG. 8c shows the voltage after passing through the second R-C filter. Where the dynode$_n$ voltage shown by line 116 in FIGS. 8b and 8c falls between the limits of lines 114 and 115 is then a function of the frequency of the original voltage shown in FIG. 8.

Those skilled in the art will recognize that a relatively small voltage, 15V, is used to actuate chip 122 and opto-isolator 145 which contains a transistor for switching the relatively large dynode voltages which are about 500–600 volts. Besides cost considerations, use of a low voltage frequency converter coupled with an opto-isolator avoids the heat that would otherwise be generated by alternative circuits which could be designed to generate dynode$_n$ voltages pursuant to a preset PMT gain signal.

Referring now to FIGS. 5 and 5a dynode$_{n\text{-}REF}$ voltage is inputted on tap line 151 and dynode$_{n\text{-}1REF}$ voltage is inputted on tap line 161. Both tap lines 151 and 161 are connected, respectively, to capacitors 170a and 170b which, in turn, are connected to ground to conventionally decouple dynode$_{n\text{-}REF}$ and dynode d$_{n\text{-}1\text{-}REF}$ voltages from supply variations. Dynode d$_n$ on line 154 connects to a control node 149 on gain voltage divider string C. A first resistor 152 connects on line 153 to control node 149 and similarly a second resistor 147 connects on line 150 to control node 149. Second line 150 also contains switch or opto-isolator 145. When switch 145 is open current flows from first tap line at dynode d$_{n\text{-}REF}$ voltage through first resistor 152 past control node 149. It is filtered through a charge storage capacitor 148 and amplified by a NPN transistor 155 after which the current passes through a third resistor 159 and is filtered a second time by a charge capacitor 160 whereat the voltage is outputted to dynode d$_n$. When switch or opto-isolator 145 is "on" current from second tap line 161 at dynode d$_{n\text{-}1\text{-}REF}$ voltage passes through second resistor 147 on line 150. As discussed above, the voltage potentials are summed and divided at control node and inputted to dynode d$_n$. A fourth resistor 164 is added to the circuit to function as a keeper resistor so that the output from node 154 tracks to control node 149.

To shut off photomultiplier 16, a second opto-isolator 175 connects a third tap line 177 having a voltage at dynode d$_{n\text{-}2\text{-}REF}$ from resistor voltage divider string A. The transistor within second opto-isolator 175 switches current to line 179 where it is filtered by capacitor 160 from third tap line 177 to dynode d$_n$ output line 154. The LED within second opto-isolator 175 biases the transistor when a computer generated PMT off signal from Pin 4 of connector 43 is generated on line 178.

Computer 28 also develops for each photomultiplier the PMT shut-off signal which is sent to gain control board 32 to shut off any selected photomultiplier 16. By selecting any specific photomultiplier to be shut off, it is possible to better calibrate a given photomultiplier in that the surrounding photomultipliers can be left shut off while the calibrated photomultiplier is turned on. In this way, the surrounding photomultipliers will not contribute to the noise of the turned on photomultiplier. Thus a better way to isolate the signal is presented because a better low noise signal is produced. Also, during operation of camera 10 it now becomes possible to shut off photomultipliers which are removed from the scintillation event.

The invention has been described with reference to a preferred embodiment. Alternations and modifications may become apparent to those skilled in the art upon reading and understanding the detailed disclosure of the invention as described herein. For example, the invention has been explained with the cathode at ground and the anode or the last dynode at high voltage. The cathode could be placed at negative high voltage and the anode or the last dynode at ground. It is intended to include all such modifications and alterations insofar as they come within the scope of the present invention.

| CIRCUIT COMPONENTS | | |
|---|---|---|
| Reference Numeral | Item (Description) | Part Number |
| 16 | Photomultiplier | XP2442BM9612Y (Phillips) |
| 54 | resistor | 1 M ohm |
| 56 | capacitor | .01 µF, 200V |
| 58 | NPN transistor | 2N6517 Motorola |
| 59 | PNP transistor | 2N6520 Motorola |
| 60 | diode | 1N4148 |
| 61 | diode | 1N4148 |
| 69 | resistor | 100K |
| 70 | capacitor | .047 µF, 2KV |
| 71 | resistor | 31K |
| 72 | resistor | 3.3K |
| 80 | resistor | 2.2M |
| 82 | capacitor | .022 µF, 2KV |
| 90 | RF transistor | 2N4958 Motorola |
| 95 | resistor | 470 |
| 96 | capacitor | .1 µF |
| 97 | capacitor | 47 µF |
| 100 | diode | 1N4148 |
| 102 | resistor | 6.49K |
| 103 | resistor | 23.2K |
| 105 | resistor | 330K |
| 106 | resistor | 3.3K |
| 108 | NPN transistor | 2N3904 Motorola |
| 109 | resistor | 6.2K |
| 110 | capacitor | 1.0 µF |
| 111 | resistor | 10K |
| 122 | voltage to frequency connecter | LM 331 National Semi Conductor |
| 125 | resistor | 10K |
| 126 | capacitor | .1 µF |
| 129 | capacitor | 10 µF |
| 130 | resistor | 2.2K |
| 133 | resistor | 90.9K |
| 135 | capacitor | .001 µF |
| 139 | resistor | 100K |
| 140 | capacitor | .068 µF |
| 142 | resister | 75K |
| 145 | opto-isolator | H11D1 Motorola |
| 146 | resistor | 47K |
| 147 | resistor | 220K |
| 148 | capacitor | 0.68 µF, 200V |
| 152 | resistor | 220K |
| 155 | NPN transistor | 2N6517 Motorola |
| 156 | diode | |
| 159 | resistor | 2.2M |
| 162 | capacitor | .068 µF, 1KV |
| 163 | resistor | 2.2M |
| 170 | capacitor | .01 µF, 1KV |
| 175 | opto-isolator | H11D1 Molorola |
| 176 | resistor | 100K |

Having thus described the invention it is claimed:

1. A gain control for a plurality of photomultipliers used in a gamma camera having an anode, a photocathode and a plurality of dynodes therebetween, said dynodes numbered sequentially from said photocathode to said anode with the first dynode adjacent said photocathode designated $d_n$ and any one specific dynode designated $d_n$;

said photocathode connected to ground;

a voltage divider resistor string extending from said anode to said photocathode, said string including a plurality of string resistors in series with one another extending from said anode to said photocathode and ground, each of said string resistors adjacent a dynode and numbered sequentially from said photocathode to said anode with the first one of said string resistors numbered $r_1$ and the resistor adjacent said specific dynode $d_n$ designated $r_n$ each one of said string resistors separated from one another by a node;

a source of constant DC voltage inputted to said string adjacent said anode;

all of said dynodes connected to said string through a node adjacent each one's respective resistor except for said specific dynode $d_n$ which is isolated from said string, a first tap line connected to the node in said string adjacent said specific resistor $r_n$ whereby the voltage potential from said string associated with said dynode $d_n$ is applied to said first tap line thereby maintaining the integrity of said resistor string; and gain means electronically connected to said dynode $d_n$ and utilizing said voltage potential on said first tap line to apply a preset gain voltage potential to said dynode $d_n$ which can vary anywhere from said first tap line voltage potential to the string voltage potential at said dynode immediately adjacent said specific dynode $d_n$ on the dynode side closer to said photocathode and designated $d_{n-1}$ whereby said preset gain voltage establishes the gain of said photomultiplier.

* * * * *